H. W. BILL.
Reaping Machine.

No. 46,630.

2 Sheets—Sheet 2.

Patented March 7, 1865.

Witnesses
Joseph T. Holloway
W. D. Butler

Inventor
H. W. Bill

UNITED STATES PATENT OFFICE.

H. W. BILL, OF CUYAHOGA FALLS, OHIO.

IMPROVEMENT IN REAPING-MACHINES.

Specification forming part of Letters Patent No. 46,630, dated March 7, 1865.

*To all whom it may concern:*

Be it known that I, H. W. BILL, of Cuyahoga Falls, in the county of Summit and State of Ohio, have invented certain new and useful Improvements in a Grain-Discharger for Reapers; and I do hereby declare that the following is a full and complete description of the construction and operation of the same, reference being had to the accompanying drawings, making a part of this specification, in which—

Figure 1:
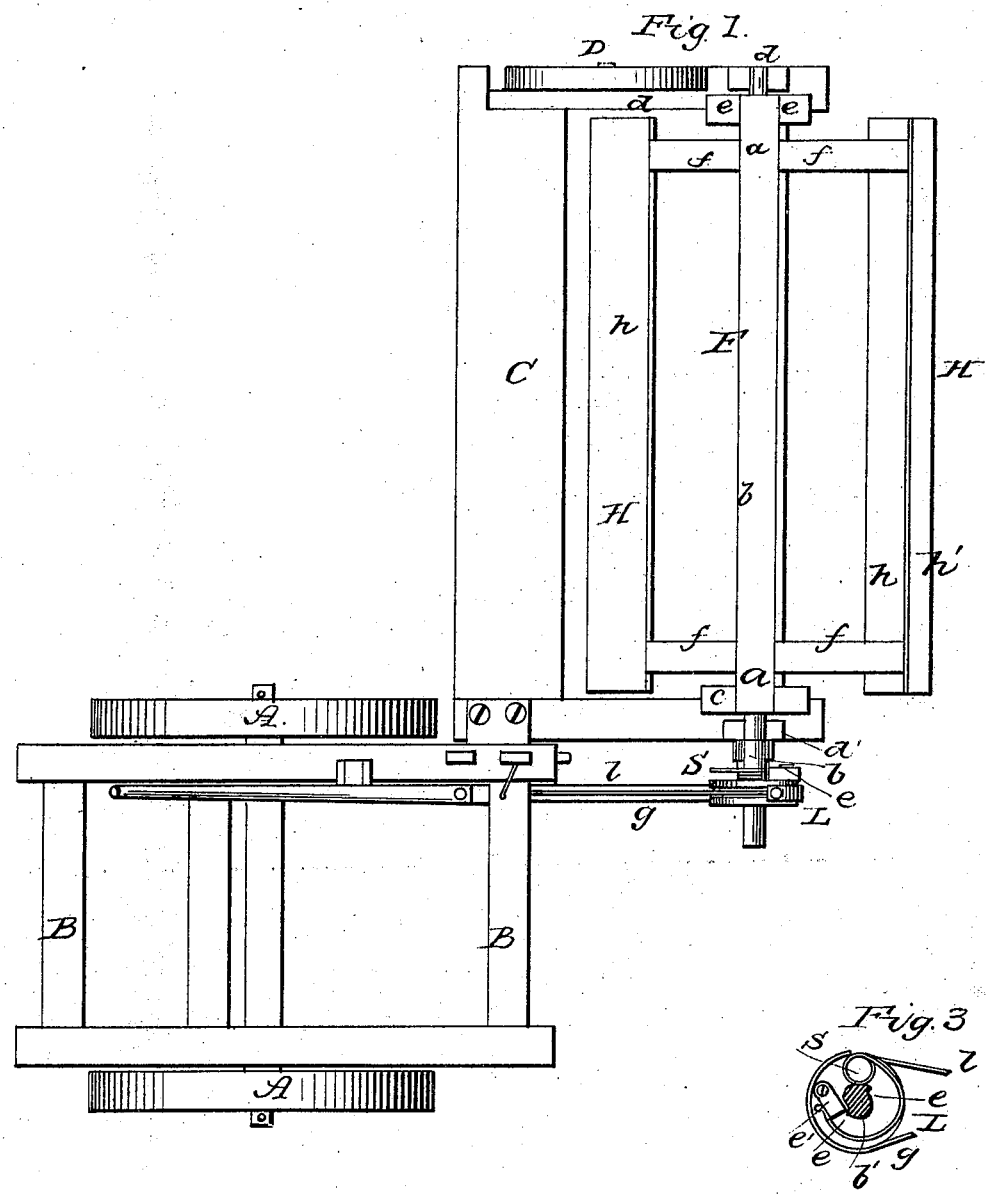
Figure 2:
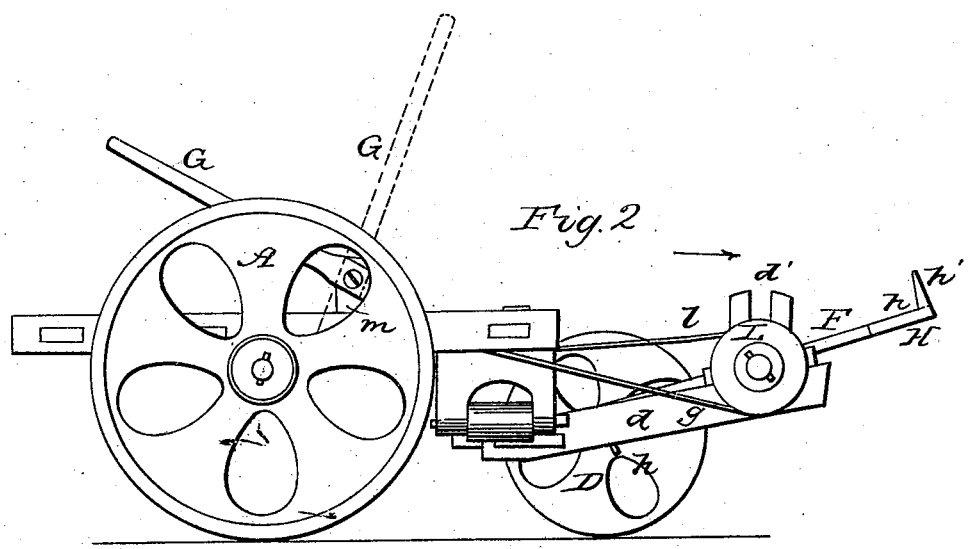

Figure 1 is a top view. Fig. 2 is a side elevation. Fig. 3 is a detached section.

Like letters of reference indicate like parts in the several views.

My improvement relates to a new mode of discharging grain from reapers by means of an elevating and rotating frame operated by an arrangement of devices connected with a hand-lever, whereby the grain is taken from the machine, carried over, and deposited on the ground in gavels.

In the drawings, A A represent the dividing-wheels of a reaper; B, the frame; and C shows the position for the cutter-bar, which is jointed or hinged to the frame.

D is a supporting-wheel at the outer end of the cutter-bar, being supported and turning in a side piece, *d*.

F is a lifting rotating frame that consists of a center piece or shaft, *b*, secured to metallic ends *a a*, that terminate in journals which rest and move in guide-boxes *d'* on the side pieces, *d*.

*c c* are cross-pieces secured to the ends *a a* of the shaft *b*, inside of the guide-boxes *d' d''*, forming bearers for the rotating frame. From the shaft *b* of the frame extend out arms *f f*, opposite each other, on the ends of which are guards H H, formed of pieces *h h* in the same plane with the arms, along the outside edges of which, on opposite sides, project lips or pieces *h' h'*, as shown in Fig. 2. Outside of the guide-box *d''* the shaft is enlarged, as at *b'*, in which notches *e e* are formed on opposite sides, as seen in Fig. 3. Outside of *b'* on the shaft is a clutch, L, on the inner side of which is pivoted a pawl, *c'*, that comes against the notches *e*, being always made to catch into the notches by means of a spiral spring, S, attached to the side of the clutch, one end of which extends round and presses on the pawl. To the rim or edge of the clutch is attached a strap, *g*, that passes round under it, and is connected to the lower end of the hand-lever G, which is pivoted at *m* to the frame. To the top of the clutch is connected a spring, *l*, that extends to the rear end of the frame B, where it is attached, and the spring fits into a groove in the clutch, keeping it in place. This spring causes the clutch to take the position shown in the drawings when the pressure from the lever is removed.

In operating this grain-discharger, constructed as described, the seat is in such a position that the lever G can be readily reached and worked by the driver. The frame F being in the position shown in Figs. 1 and 2, when the grain from the cutter-bar has fallen upon it in a sufficient quantity to form a gavel, by raising the lever G into the position indicated by the dotted lines G', the strap *g* is drawn back, which raises and turns round the clutch L simultaneously, elevating and turning the frame until the frame is turned over and the gavel of grain deposited on the ground. As soon as the pressure from the lever is removed, the spring *l*, contracting, draws the clutch back to its position. The clutch is hung upon the shaft, and turns back independently of it, but is made to operate the frame by means of the pawl or dog *e'* coming against one of the notches *e*, which turns the shaft, revolving the frame that moves vertically at the same time by means of the outer ends of the bearers *c c* turning down on the side pieces, *d*, whereby the frame is elevated simultaneously with its being turned over to deposit the grain, the shaft moving upward and turning in the guide-boxes *d' d''*. When the pressure from the lever is removed, the frame is turned half-way round and rests in that position, and the spring *l* draws the clutch back on the shaft, and the dog *e'* comes against the opposite catch on the shaft, which firmly retains the frame in that position, prepared to receive the grain for another gavel. The grain falls alternately on the different sides of the frame, the plane side being always uppermost next the cutter-bar for that purpose.

The object of the shelf or lip *h* projecting on opposite sides of the frame, forming a guard, as represented and described, is that as the frame is turning over the grain slides down and the ends lodge on the shelf until it all falls off together on the ground, thereby preventing any of the grain from slipping off in different places, as it would otherwise be liable to do. Another peculiarity in the operation of this frame is that the frame is at first raised up with the grain upon it, so that it lifts the grain from the machine as it carries it over, for if the frame were turned round directly without this lifting motion the grain would be apt to be turned off or slide off and not be taken up by the frame.

This discharger is entirely under the control of the driver, and gavels of grain of any size can be gathered before being turned off.

What I claim as my improvement, and desire to secure by Letters Patent, is—

1. Removing the grain from the machine and depositing it upon the ground in gavels by means of the frame F, raised and rotated by one continuous operation, substantially as set forth.

2. The guards H, in connection with the frame F, as and for the purpose set forth.

3. The bearers $c\ c$, in connection with the frame F, as and for the purpose set forth.

4. Rotating the frame F by means of the pawl $e$ and spring S, in combination with the shaft $b$ and catches $c\ c$, substantially as and for the purpose set forth.

H. W. BILL.

Witnesses:
J. T. HOLLOWAY,
W. D. BUTLER.